United States Patent [19]

Lindsey

[11] Patent Number: 5,896,536
[45] Date of Patent: *Apr. 20, 1999

[54] DATA TRIGGERED TRACE SUPPORT FOR DEBUGGING OBJECT ORIENTED PROGRAMS

[75] Inventor: Anthony Hayden Lindsey, Fuquay Varina, N.C.

[73] Assignee: International Business Machines Corp., Armonk, N.Y.

[*] Notice: This patent is subject to a terminal disclaimer.

[21] Appl. No.: 08/640,613

[22] Filed: May 1, 1996

[51] Int. Cl.[6] .................................................... G06F 9/44
[52] U.S. Cl. ...................................... 395/704; 395/183.11
[58] Field of Search ............................... 395/704, 183.11, 395/183.14, 183.21, 183.15

[56] References Cited

U.S. PATENT DOCUMENTS

| | | | |
|---|---|---|---|
| 4,885,717 | 12/1989 | Beck et al. | 364/900 |
| 5,093,914 | 3/1992 | Coplien et al. | 395/700 |
| 5,408,650 | 4/1995 | Arsenault | 395/575 |

OTHER PUBLICATIONS

"Provide: A Process Visualization and Debugging Environment", Moher T.G., IEEE Trans. on Soft. Engg., v14 No. 6, Jun. 1988 pp. 849–857.

"Practical Data Breakpoints: Design and Implementation", Wahbe R. et al., ACM SIGPLAN Notices, No. 6, Jun. 1993, pp. 1–12.

*Primary Examiner*—Tariq R. Hafiz
*Assistant Examiner*—Kakali Chaki
*Attorney, Agent, or Firm*—Gregory M. Doudnikoff

[57] ABSTRACT

A technique for permitting tracepoints to be set relative to data components of object oriented programs for debugging purposes is disclosed. A new method is created or an existing method is modified in an object which contains data relative to which tracing is desired. The new or modified method intercepts a message intended to access the designated data, and depending on the type of access being attempted and/or other conditions set by the developer, tracing may be initiated, modified, or terminated. Tracing is controlled by forwarding an appropriate message to a trace manager. The read or write operation is preserved by the newly created access method, which performs the desired access of the data component.

14 Claims, 6 Drawing Sheets

DATA TRIGGERED TRACE SUPPORT FOR DEBUGGING OBJECT ORIENTED PROGRAMS

BACKGROUND OF THE INVENTION

1. Field of the Invention

The present invention relates to a technique for debugging object oriented software applications. More particularly, the present invention provides a data triggered trace support in a debugger for debugging object oriented software programs.

2. Description of the Related Art

One critical and often overlooked component in the process of developing software programs is the elimination of errors from the software programs. The process of eliminating errors is known as debugging. After one or more software developers writes the code for a software program and the code files are built to produce an executable version of the software program, the software program must be tested to determine what errors exists in the program, and then the program must be debugged to reduce or eliminate the errors. For commercial software, it is imperative that most of the errors or bugs are found and eliminated prior to the software being released to the marketplace. The debugging process can be quite extensive, costly and time consuming. Accordingly, software tools and techniques have been developed to assist in the debugging of code and reduce the debugging cycle time.

For errors or bugs found in commercial software applications that have already been released, time is critical. Software manufactures must have tools to respond to customer complaints about bugs rapidly and provide fixes and/or debugged software quickly. Software errors or bugs can be categorized into two types. The first type is a logic error, in which logic statements or commands included by the software developer in the program are flawed, such that the desired function is not performed during execution of the program, or is not performed properly, etc. Typically, logic errors cause the program to execute functions or commands within the program which are not desired by the developer. The second type of error is with regard to data being maintained or used by the program, and occurs when the data is somehow corrupted.

A number of debugging functions and techniques are presently employed in currently available debugging software tools. One set of known techniques are referred to as testpoints, and include the setting of breakpoints, tracepoints, watchpoints, etc. However, the use of tracepoints is somewhat limited. While tools exist to set tracepoints so as to trigger a creation of trace information upon the execution of a specific logic unit in a program being debugged, no similar mechanism exists for setting tracepoints so as to trigger tracing relative to specific data elements or entities, such as instance variables in Smalltalk language programs, within or utilized by a program being debugged. The existing logic based trace function can create information regarding data movement, but only in the context of data movement that occurs upon the execution of a logic unit, such as a Smalltalk method. Further, information is created relative to all data components affected by execution of the logic unit. Where the information is being sought relative to a single data entity, the logic-based tracepoint procedure is costly in terms of processing time, since information relative to all affected data components is gathered, and in terms of developer time, as the developer must sort through information relevant to all affected data components to find information pertaining to the desired one. The ability to trigger the generation of trace data based upon a specific data component so that information can be obtained relative to the data component during execution of logic units would be a valuable tool for developers in the debugging of programs.

Recently, a revolution of sorts has been occurring in the software industry. Until recently, most software programs have been written in procedural languages, such as C and COBOL. Accordingly, debugging tools and techniques were designed to debug procedural programs. The advent of object oriented languages has created a paradigm shift. Object oriented languages are fundamentally different in the way they are written by developers and executed by a computer at runtime. In the two leading object oriented languages, C++ and Smalltalk, data is actually stored within the objects in object oriented programs written in these languages. In Smalltalk, data is stored in the instance variables of Smalltalk objects and the class variables or class instance variables of Smalltalk classes, and in C++, data is stored in the variables of the C++ objects. Thus, object oriented programs present new challenges for debugging tools.

U.S. Pat. No. 5,093,914, which issued to Coplien et al., discloses a method for using breakpoints in the debugging of object oriented programs. This patent is of interest because a breakpoint is one type of test point. However, the Coplien patent does not address tracepoints, and does not address the problem of or provide a solution for the lack of a trace function relative to data components of an object oriented program.

IBM's cross system product (CSP), version 4.1, which was released in 1992, provides an object oriented solution for the debugging of procedural programs. However, while that product provides for the use of tracepoints relative to logic units, it does not enable the setting of tracepoints relative to data components in a procedural program.

Accordingly, a need exists for a debugging tool which permits a developer to set tracepoints for specific data components within an object oriented program under going debugging in order to gather trace information specific to the designated data components.

SUMMARY OF THE INVENTION

An object of the present invention is to provide a technique for debugging object oriented program code with tracepoints which trigger tracing based upon access of or modification to a specific data component.

Another object of the invention is to provide a tracepoint based debugging technique for data components within object oriented software which requires minimum processor overhead.

Other objects and advantages of the present invention will be set forth in part in the description and the drawings which follow, and, in part, will be obvious from the description, or may be learned by practice of the invention.

To achieve the foregoing objects, and in accordance with the purpose of the invention as broadly described herein, a technique is described for execution on a processor in a data processing environment for enabling gathering of trace information during debugging of an object oriented program based upon access to a data component of the object oriented program, comprising first subprocesses for permitting a user to designate a data component of said object oriented program relative to which an access thereto is desired to initiate collection of trace information; and second subprocesses for initiating collection of trace information triggered by the sending of a message is sent to access the designated data component. The first subprocesses may further permit a user to designate parameters for controlling the collection of trace information based upon accesses to the designated data component. One of the parameters may be an event upon which collection of trace information will terminate, and the technique may further comprise third subprocesses for ceasing the collection of trace information upon occurrence of the termination event. The first subprocesses may further comprise creating at least one access method for the designated data component and replacing all direct references of the designated data component within methods of the object oriented program with message sends to the newly created access method. The first subprocesses may create a read tracepoint access method and a write access tracepoint method, and all read messages for the designated data component generated by the object oriented program are sent to the read tracepoint access method and all write messages for the designated data component generated by the object oriented program are sent to the write tracepoint access method. The technique may further comprise fourth subprocesses for causing the access method to perform a requested access function after receiving an access message; and fifth subprocesses for modifying the collection of trace data after the access method has performed the requested access function.

In a computing environment including at least a processor and memory, a system is also provided for causing trace data to be collected based upon accessing a data component of an object oriented program undergoing debugging, comprising means for designating at least one data component of the object oriented program for which an attempt to access the data component is desired to initiate collection of trace data; and means for triggering the collection of trace data when the designated data component is accessed. The system may further comprise means for designating tracing parameters.

A method is also provided for collecting trace data when a data component of an object oriented program undergoing debugging is accessed, comprising the steps of designating a data component of the object oriented program for which an access attempt will affect tracing; creating at least one access method through which access attempts for the designated data component will be routed during debugging; and triggering collection of trace data when the access method receives an access attempt for the designated data component. The creating step may create a read access method for receiving all read access requests for the designated data component and a write access method for receiving all write access requests for the designated data component. The method may further comprise the steps of accessing the designated data component after the access method receives the access attempt; and modifying the collection of trace data after the designated data component has been accessed.

The present invention will now be described with reference to the following drawings, in which like reference numbers denote the same element throughout.

DESCRIPTION OF THE PREFERRED EMBODIMENT

The present invention may be implemented in any of a variety of object oriented programming languages, such as Smalltalk, C++, SELF, etc.

Figure 1:
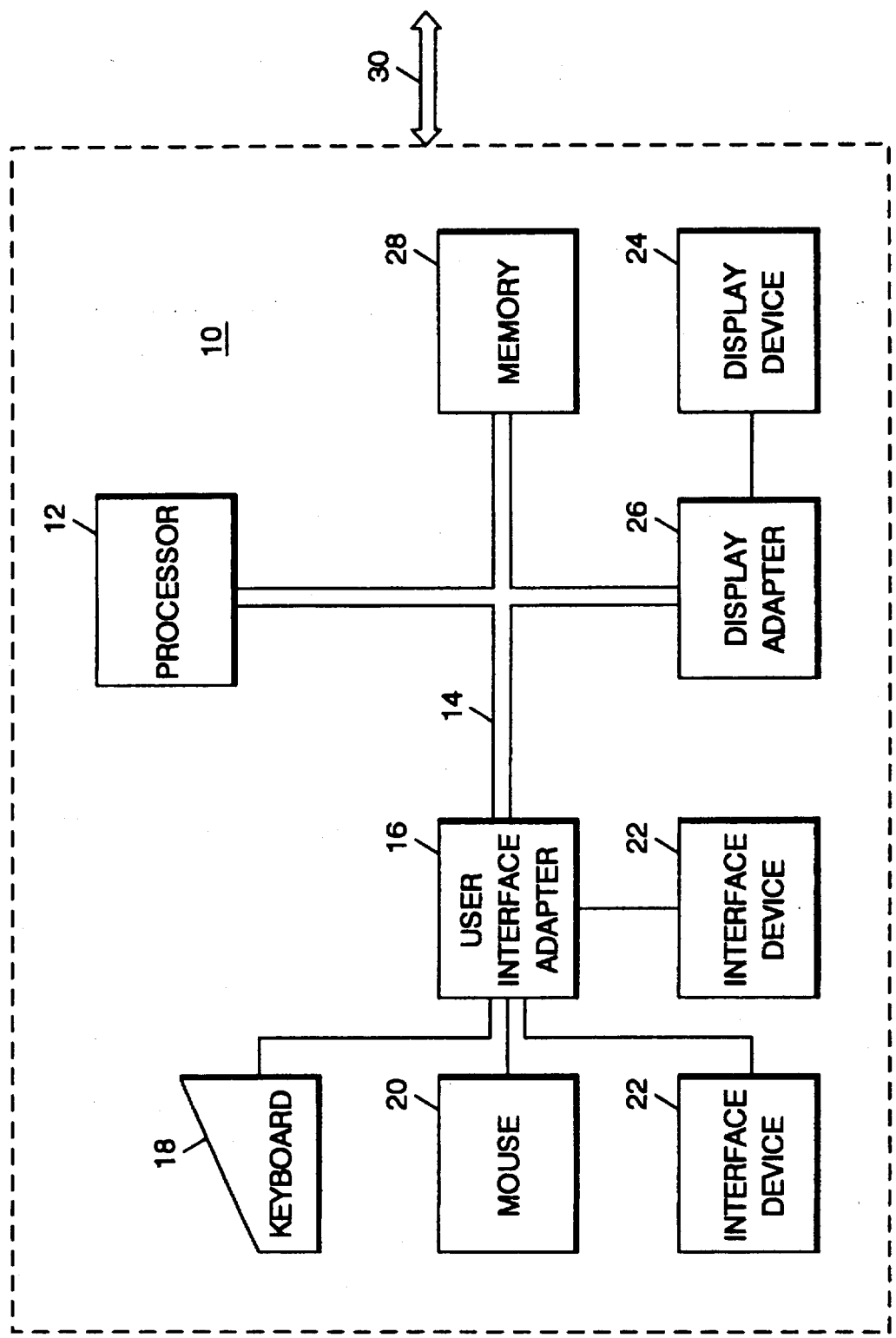
FIG. 1 is a block diagram of a representative hardware environment in which the present invention may be practiced.

FIG. 1 illustrates a representative hardware environment in which the present invention may be practiced. The environment of FIG. 1 comprises a representative conventional single user computer workstation 10, such as a personal computer, including related peripheral devices.

The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized pen entry pad, etc.

The bus 14 also connects a display device 24, such as an LCD screen or monitor, to the microprocessor 12 via a display adapter 26. The bus 14 also connects the microprocessor 12 to memory 28, which can include ROM, RAM, etc. The workstation 10 communicates via a communications channel 30 with other computers or networks of computers. The workstation 10 may be associated with such other computers in a local area network or a wide area network, or it can be a client in a client/server arrangement with another computer, etc. All of these configurations, as well as the appropriate communications hardware and software, are known in the art.

Software programming code which embodies the present invention is typically stored in the memory 28 of the workstation 10. In a client/server environment, such software program code may be stored with memory associated with a server. The software program code may be embodied on any of a variety of known media for use with a data processing system, such as a diskette or CD-ROM. The code may be distributed on such media, or may be distributed to users from the memory of one computer system over a network of some type to other computer systems for use by users of such other systems. The techniques and methods for embodying software program code on physical media or distributing software code via networks are well known and will not be further discussed herein.

The preferred embodiment of the present invention will now be described with respect to FIGS. 2–6. In the preferred embodiment, the present invention is implemented in the Smalltalk object oriented language.

Object oriented languages are fundamentally different than procedural languages, and the execution of software programs written in object oriented languages is carried out by the execution of methods. Methods are the logic portion of objects. The execution of a method may perform a calculation and cause the subsequent sending of messages to other objects which in turn cause additional methods to execute and cause further messages to be sent. The features and function of object oriented programs are well known and will not be further discussed herein. The present invention relies on the addition of a method to an object having an instance variable or to a class having a class variable or class instance variable relative to which the gathering of trace information is desired, or the modification of an existing method within such an object. It is not necessary for the remaining portions of the debugging tool to be written in or implemented in an object oriented language.

This invention permits the setting of tracepoints for data entitles of programs written in object oriented languages. Commonly assigned and copending patent application Ser. No. 08/641,666 entitled "Data Triggered Trace Technique for Debugging Software Programs", having the same inventor and filed on even date herewith, describes a technique whereby tracepoints can be set relative to data items during the debugging of procedural programs.

A tracepoint is a type of testpoint which is a specialized debugging trigger that directs the debugging tool to alter its global trace state. The present invention controls the collection of trace information by allowing the global trace state to be changed pursuant to the accessing (reading or writing) of a designated data component of object oriented programs. In Smalltalk, tracing may be triggered by associating tracepoints with instance variables, class variables or class instance variables (referred to collectively as instance variables hereinafter), which are the data entities of Smalltalk objects.

When the trace function is triggered, the debugger collects trace information regarding the present status of items related to the program and what is occurring during execution of the program. This information is made available to the developer for use in attempting to debug the program. The specifics of what occurs in a debugger when a trace function is implemented or triggered is not necessary for the understanding of the present invention, and will not be described herein in detail, and is already known in the art.

Figure 2:
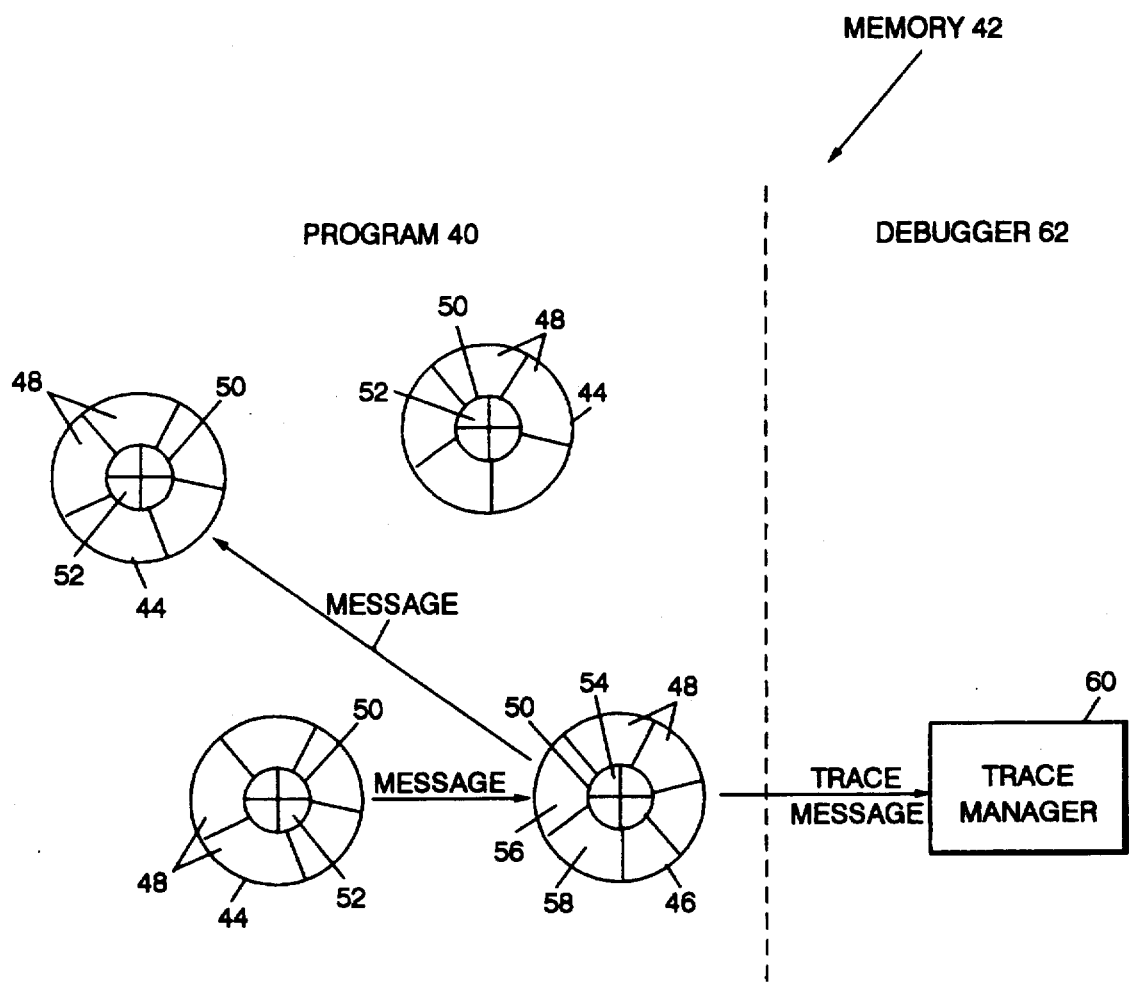
FIG. 2 is a generalized architectural diagram which illustrates the logical flow of data during execution of a program being debugged while utilizing the present invention.

The architecture and general logic flow for the present invention are illustrated in FIG. 2. In an object oriented program, methods associated with each object comprise the logic portion of the program. As each method is executed, it performs logic by sending messages to other objects and by manipulating data in instance variables. In this description, an attempt to "access" an instance variable can mean an attempt to read the instance variable, to modify the instance variable, write the instance variable, etc. FIG. 2 illustrates a portion of an object oriented program 40 which resides in memory 42 and is comprised of objects 44, 46. Each of the objects 44, 46 comprise a number of methods 48, which constitute the logic portion of the objects 44,46 and data portions 50 which contain instance variables 52 associated with the objects 44,46. Prior to modification, the object 46 differs from the objects 44 only in that it contains the data portion 50 which includes an instance variable 54 which has been designated by a developer for having an access thereto affect tracing. In accordance with the present invention, read and/or write access methods 56, 58 are added to the object 46 such that any attempt to access the designated instance variable 54 of the object 46 must be routed through one of the access methods 56, 58. Depending on the parameters set by the developer, when an attempt is made to access the designated instance variable 54, either the read access method 56 or the write access method 58 executes (as appropriate) so that a trace message is sent to a trace manager 60 of a debugger 62 (also logically located in memory 42) for implementing tracing, and the desired tracing relative to the designated instance variable 54 of the object 46 is carried out.

The methods 56, 58 provide read and write access to the designated instance variable 54 during execution. Then, prior to ending execution, the methods 56, 58 may further effect tracing after performing the appropriate access of the designated instance variable 54. This may involve sending a second trace message to the trace manager 60 to cause tracing to terminate, or to modify tracing parameters or what information is gathered, or to initiate tracing, etc. The methods 56, 58 may count accesses and types of accesses so that tracing is initiated and completed only upon a certain type of access or upon a certain numbered attempt to access the designated instance variable 54. Alternatively, this logic may be included in the trace manager 60, with the trace messages simply informing the trace manager 60 that an access attempt has occurred and that the access has occurred.

The trace manager 60 gathers the trace information in accordance with the designated parameters and then outputs the trace information at a time and in a manner in accordance with known techniques.

Figure 3:
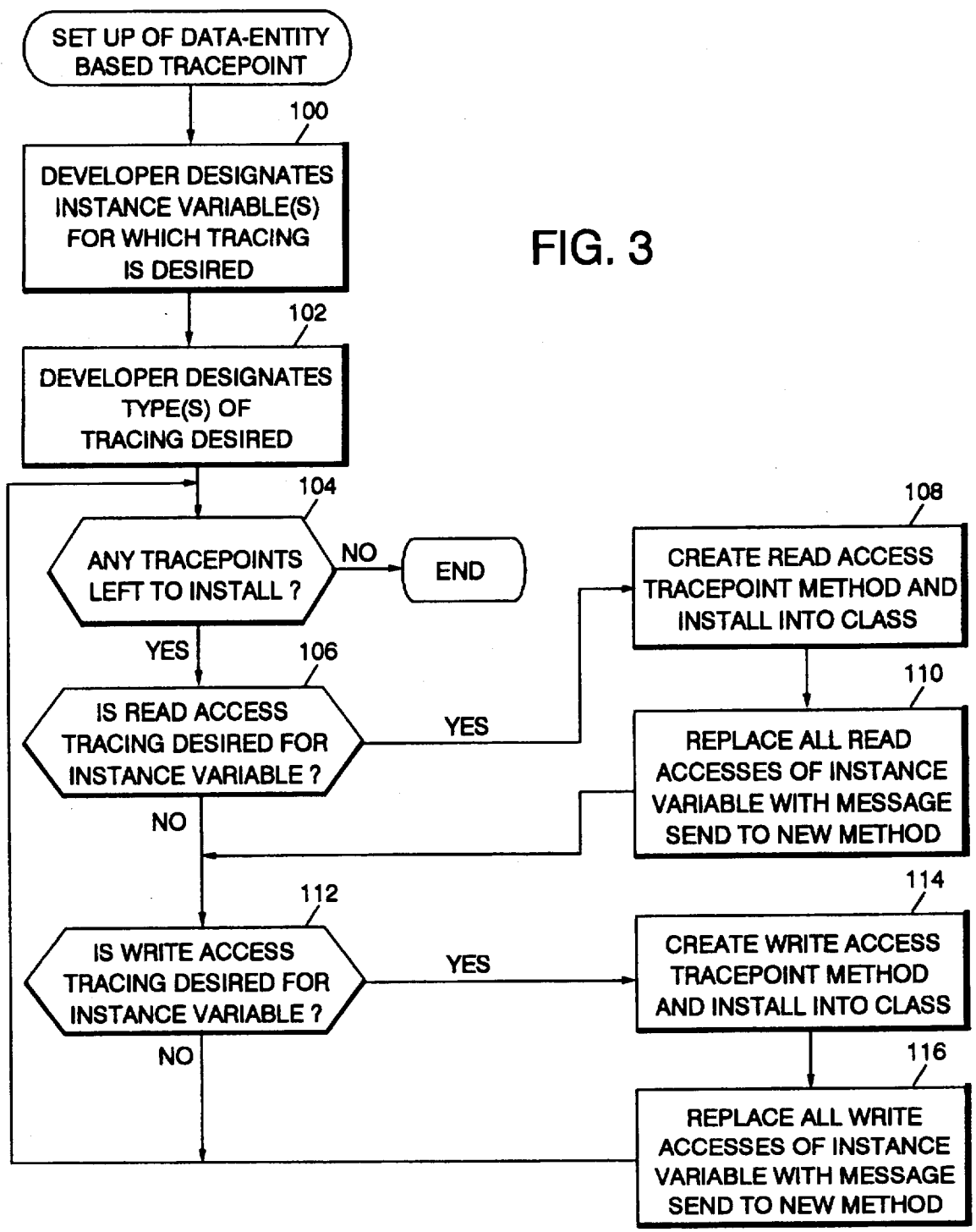
FIG. 3 is a flowchart illustrating the logical steps associated with setting a tracepoint for data components in accordance with the present invention.
Figure 4:
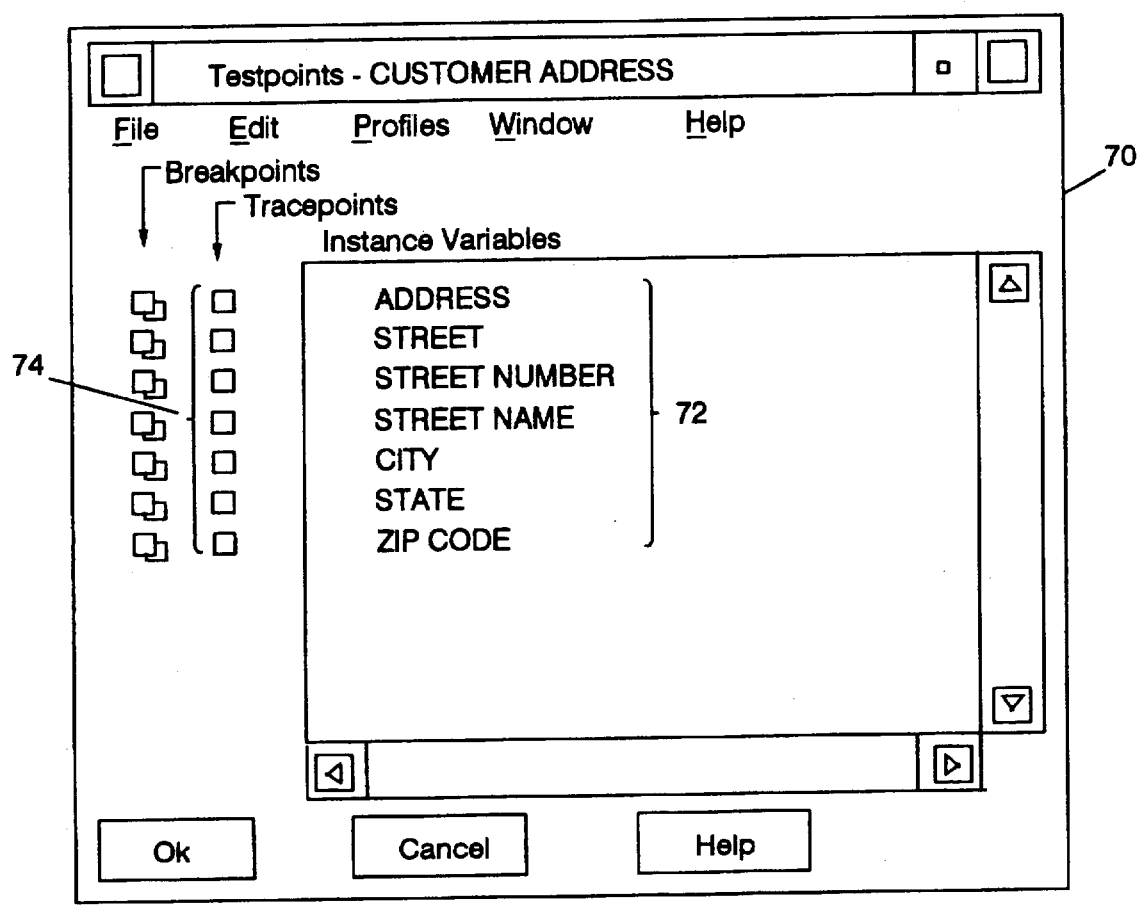
FIG. 4 illustrates a window which may be employed by a debugging tool or routine through which a developer may set test points for specific data components in an object oriented program to be debugged.

The logic involved with setting up a tracepoint relative to an instance variable in accordance with the preferred embodiment will now be described with reference to the flowchart of FIG. 3. The debugger 62 permits the developer to designate one or more instance variables 54, relative to which the developer desires that access thereto to trigger or otherwise affect tracing (Step 100). FIG. 4 illustrates a window 70 displayed within a user interface of a software debugger tool. Through the dialog provided in the window 70, a developer may set tracepoints for specific data components or instance variables associated with a class or object within the object oriented program being debugged. A scrollable list 72 of data elements or instance variables is provided in the window 70. A number of selectable boxes 74, one logically associated with each data item in the list 72, is also provided in the window 70. The developer sets a tracepoint relative to a given instance variable from the list 72 by selecting the box 74 associated with the desired instance variable.

Figure 5:
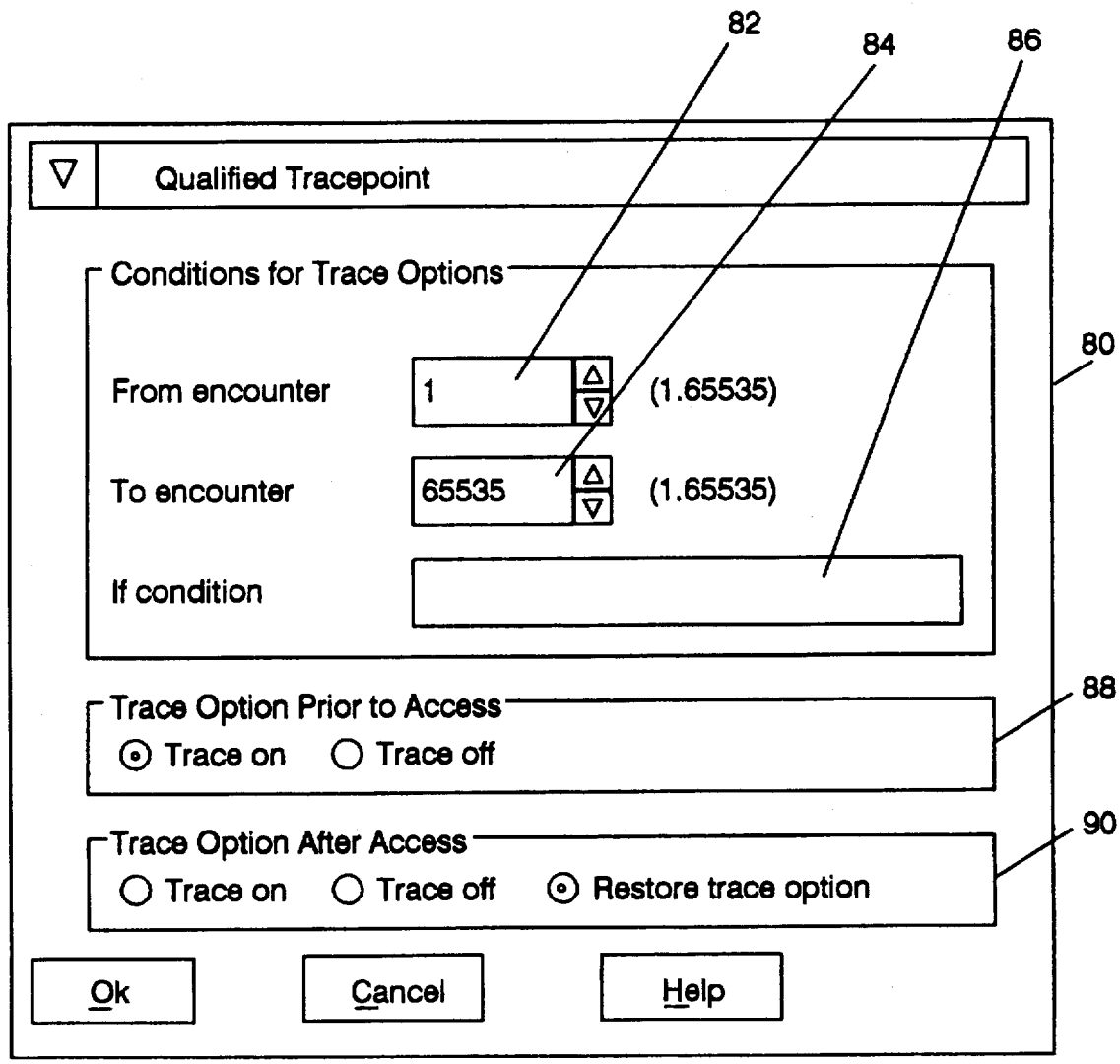
FIG. 5 illustrates a window which may be employed in a debugging program or routine which permits a developer to set the specific tracepoint parameters.

FIG. 5 illustrates a window 80 which may be displayed in a user interface of a software tool which provides the developer with options available for the tracing being set relative to the selected instance variables. For example, the developer can specify which access of the instance variable (i.e., the first, tenth, eightieth) during execution of the object oriented program will cause the tracing function to be turned on by setting a number in box 82. Additionally, the developer may designate a particular access upon which the tracing is to be turned off by setting a number in box 84. Further, the developer can specify the type of access or specific conditions which trigger tracing relative to the instance variable. Specific conditions can be identified by the developer under which the trace function is to be initiated by setting an appropriate condition in box 86.

Box 88 is employed by the developer to cause tracing to be initiated or terminated during execution of one of the access methods 56, 58 prior to access of the designated instance variable. Additionally, by selecting the corresponding choice in box 90, after the appropriate access methods 56, 58 has accessed the designated instance variable 54, the developer can cause tracing to stop or start, or cause the appropriate option to be available.

Referring once again to FIG. 3, after the developer designates one or more instance variables relative to which the triggering of tracing is desired (Step 100), the developer designates specific functional parameters for the trace function in Step 102 via the window 70 of FIG. 5. The specific functional parameters may be the same for all of the designated instance variables, or may be set specifically for each designated instance variable. The debugger 62 then modifies the program 40 as follows. Until a tracepoint has been installed relative to each designated instance variable (Step 104), one of the designated instance variables is selected and its corresponding tracepoint is selected for installation. A determination is first made as to whether tracing is desired for a read access of the instance variable (Step 106). If so, a read access tracepoint method is created and installed into the appropriate class such that it is logically located to intercept messages for the designated instance variable (Step 108). The read access tracepoint method 56 is illustrated in FIG. 2 as being located in the object 46 in which the designated instance variable 54 is located. Next, all read accesses of the designated instance variable 54 in the program 40 are replaced with a message send to the read access tracepoint method 56 (Step 110). Thus, during execution of the program 40 during debugging, all attempts to read the instance variable 54 will go through the read access tracepoint method 56.

If it is determined that there is no tracing desired relative to a read access in Step 106, or after completion of Step 110, processing proceeds to Step 112. In Step 112, it is determined whether the developer wants a write access of the designated instance variable to affect tracing. If so, a write access tracepoint method 58 relative to the designated instance variable is created and added to the object 46 (or the appropriate object or class related to the object 46) (Step 114). Next, all write accesses of the designated instance variable in the program 40 are replaced with a message send to the write access tracepoint method 58 (Step 116) so that during execution of the program 40 during debugging, all attempts to write to the designated instance variable 54 will be routed through the write access method 58.

If it is determined in Step 112 that no tracing is desired relative to a write access of the designated instance variable 54 or after completion of installation of the write access method in Step 116, processing returns to Step 104. In Step 104, if it is determined that there are additional designated instance variables for which tracing is to be set up, one of those instance variables is selected and Steps 106–116 are repeated relative to the selected instance variable. When, in Step 104, it is finally determined that no additional tracepoints must be set, the set up process ends.

In some programs, read and/or write access for a given instance variable may already be routed through an access method. In such cases, it is preferred that new access methods be created as described above, and the message sends to the designated data component in the existing read or write access methods will be modified to refer to the newly created access methods as appropriate.

In the preferred embodiment, the read and write access tracepoint methods 56, 58 include logic which determines whether tracing is to be initiated or ended, in accordance with the developer input trace function parameters, whenever one of the methods in the program 40 attempts to read or write to the designated instance variable 54. The read and write access tracepoint methods 56, 58 include logic which causes the developer input trace function parameters to then be carried out as appropriate. The tracepoint access methods 56, 58 send a trace message to the trace manager 60 to begin the tracing in accordance with the designated parameters.

Alternatively, logic relative to the parameters may be maintained in the trace manager 60 and/or the debugger 62, with the access methods 56, 58 simply sending messages to the trace manager 60 for further processing.

Figure 6:
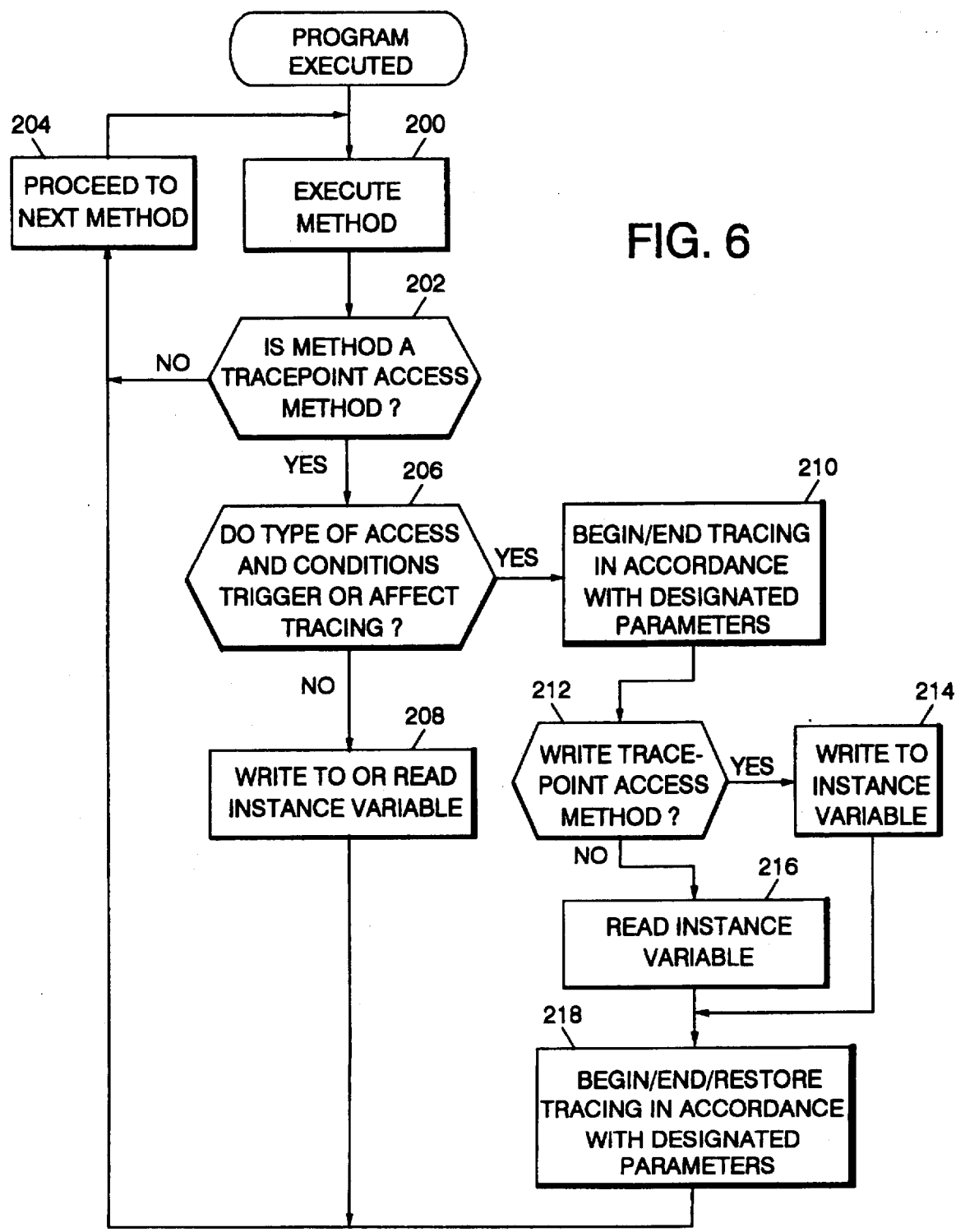
FIG. 6 is a flowchart illustrating the logical steps for triggering a trace function based on access of a data component in an object oriented program.

The logic associated with the execution of the object oriented program 40 and the debugging tool 62 during debugging will now be described in detail with reference to FIG. 6. During debugging, the methods within the object oriented application 40 undergoing debugging are executed under control of the debugging tool 62 to approximate actual execution of the object oriented program 40 in real use. As each method is executed (Step 200), a determination is made as to whether or not the method being executed is one of the read or write tracepoint access methods (Step 202). If not, processing proceeds normally, and when execution of the method is completed, the next method for execution is determined and executed (Steps 204, 200). However, if it is determined in Step 202 that the method being executed is one of the tracepoint access methods, processing will proceed as follows based on logic included in the access method in conjunction with the trace manager 60 and the debugger 62. The following processing is carried out by execution of the access method. If the method being executed is not an access method, the following processing for tracing is not carried out. This keeps processor overhead associated with tracing to a minimum, as processing will be carried out relative to tracing only in a situation where the method being executed is an access method.

In Step 206, logic in the access method (or the trace manager 60) determines if the type of access and the present conditions trigger or otherwise affect tracing as per the parameters set by the developer. If not, the access method permits the appropriate access of the designated instance variable 54, and the access method writes to (stores) the instance variable or read (answers) the instance variable, as appropriate (Step 208). The access method 54 then becomes inactive, and the execution of the overall program is continued with the execution of the next method (Steps 204, 200).

However, if it is determined in Step 206 that the type of access being attempted during the execution of the access method is defined to affect tracing and/or the conditions associated with the access are sufficient to affect tracing, processing proceeds to Step 210, in which tracing is affected in accordance with the designated parameters. For example, tracing may be initiated, or tracing may be ended. This is accomplished by the access method sending an appropriate message to the trace manager 60, which carries out the trace function in conjunction with the debugging tool 62 in accordance with known techniques.

Different types of access may affect the triggering of the tracing in Step 210 differently. An access to read the value contained in the designated instance variable 54 may trigger tracing, while an access to write a value to the designated instance variable 54 might not. Similarly, while the first or the fifth access may not trigger tracing, the tenth attempt to access might trigger tracing, and the twentieth attempt to access might end tracing. This is also set by the developer via the window 80. The logic to implement the above could be maintained within the access methods 56, 58 by creating the access methods 56, 58 such that they are able to determine and keep count of the accesses and send messages to the trace manager 60 to turn on and off the tracing dependent on the user designated parameters. Alternately, this logic could be contained in the trace manager 60, with the access methods 56, 58 simply sending a message to the trace manager 60 upon execution. The latter trace message could simply contain information regarding the type of access, or alternatively, could be the original message from the originating method, whereby the logic for implementing the designated parameters would be included in the trace manager 60 which would interpret the message appropriately to control tracing.

If the access method is a write access method, the write access method 56 writes the value it received in the message it received from the method that was attempting to write to the designated instance variable 54 in the designated instance variable 54 (Steps 212, 214). If the access method is a read access method, it will have received a message from a method within the program 40 that was trying to read the designated instance variable 54. During the set-up process, the reference to the designated instance variable 54 will have been replaced with a reference to the read access method 58 such that the attempt to read the designated instance variable 54 will be sent to the read access method 58. As per Step 216, the read access method 58 reads the designated instance variable 54 on behalf of the originating method.

After either Step 214 or 216, following the appropriate access of the designated instance variable 54, the execution of the read or write access method 56, 58 may once again affect tracing. Depending on the parameters set by the developer via the box 90 of FIG. 5, tracing may be initiated, terminated or restored upon occurrence of or dependent upon a set condition (Step 218). Step 218 is carried out in a manner like that described relative to Step 210, in that the appropriate logic is included in the access method 56, 58 (or, alternatively, the trace manager 60), and an appropriate message is forwarded to the trace manager 60 to appropriately affect tracing.

Upon the completion of execution of the access method, the processing of the program 40 continues with the execution of the next method (Steps 204, 200).

It should be noted that the function can be implemented in other ways. In Smalltalk, modifications to the Smalltalk virtual machine could make implementation of the function much easier and obviate the need to search the program and replace each instance variable access with a message send to the created access methods.

The skills required to implement the subject invention are well within the skills of those having ordinary skills in the art. While one embodiment of the invention has been described, it will be appreciated by those skilled in the art, that various modifications and variations are possible without departing from the spirit and scope of the invention.

I claim:

1. Computer readable code stored on media for execution on a processor in a data processing environment for enabling gathering of trace information during debugging of an object oriented program based upon access to a data component of the object oriented program, comprising:

first subprocesses for permitting a user to designate a data component of said object oriented program relative to which an access thereto by an element of the object oriented program during execution thereof is desired to initiate collection of trace information; and second subprocesses for initiating collection of trace information triggered by the sending of a message is access the designated data component.

2. Computer readable code according to claim 1, wherein said first subprocesses further permit a user to designate parameters for controlling the collection of trace information based upon accesses to the designated data component.

3. Computer readable code according to claim 2, wherein one of the parameters is an event upon which collection of trace information will terminate, said computer readable code further comprising third subprocesses for ceasing the collection of trace information upon occurrence of the termination event.

4. Computer readable code according to claim 1, wherein said first subprocesses further comprise creating at least one access method for the designated data component and replacing all direct references to the designated data component within methods of said object oriented program with message sends to the access method.

5. Computer readable code according to claim 4, wherein the access method controls the gathering of trace information.

6. Computer readable code according to claim 4, wherein the access method initiates the collection of trace information after receiving a message to access the designated data component.

7. Computer readable code according to claim 6, further comprising:

fourth subprocesses for causing the access method to perform a requested access function after receiving an access message; and fifth subprocesses for modifying the collection of trace data after the access method has performed the requested access function.

8. Computer readable code according to claim 1, wherein the designated data component is an instance variable of an object of the object oriented program.

9. Computer readable code according to claim 1, wherein said first subprocesses create a read tracepoint access method and a write access tracepoint method, and all read attempts for the designated data component generated by the object oriented program are sent to the read tracepoint access method and all write attempts for the designated data component generated by the object oriented program are sent to the write tracepoint access method.

10. In a computing environment including at least a processor and memory, a system for causing trace data to be collected based upon accessing a data component of an object oriented program undergoing debugging, comprising:

means for designating at least one data component of the object oriented program for which an attempt to access the data component is desired to initiate collection of trace data; and means for triggering the collection of trace data when the designated data component is accessed during execution of the object oriented program.

11. In a computing environment, a system for causing trace data to be collected according to claim 10, further comprising means for designating tracing parameters.

12. A method for collecting trace data when a data component of an object oriented program undergoing debugging is accessed, comprising the steps of:

designating a data component of the object oriented program for which an access attempt will affect tracing;

creating at least one access method through which access attempts for the designated data component will be routed during debugging; and triggering collection of trace data when the access method receives an access attempt for the designated data component.

13. A method for collecting trace data according to claim 12, wherein said creating step creates a read access method for receiving all read access requests for the designated data component and a write access method for receiving all write access requests for the designated data component.

14. A method for collecting trace data according to claim 12, further comprising the steps of:

accessing the designated data component after the access method receives the access attempt; and modifying the collection of trace data after the designated data component has been accessed.

* * * * *